(12) United States Patent
Long et al.

(10) Patent No.: US 8,161,075 B1
(45) Date of Patent: Apr. 17, 2012

(54) SYSTEMS AND METHODS FOR MANAGING INTEGRATED AND CUSTOMIZABLE DATA

(75) Inventors: Robert M. Long, Riverview, FL (US); Chi-Hwei Julie Lin, Somerville, MA (US); Tsehsin Jason Liu, Wellesley, MA (US)

(73) Assignee: Verizon Laboratories Inc., Waltham, MA (US)

( * ) Notice: Subject to any disclaimer, the term of this patent is extended or adjusted under 35 U.S.C. 154(b) by 206 days.

(21) Appl. No.: 11/443,363

(22) Filed: May 31, 2006

(51) Int. Cl.
*G06F 7/00* (2006.01)

(52) U.S. Cl. ........................ 707/793; 707/805
(58) Field of Classification Search .................. 707/101, 707/9, 4, 793, 805
See application file for complete search history.

(56) References Cited

U.S. PATENT DOCUMENTS

| | | | |
|---|---|---|---|
| 5,446,885 A | 8/1995 | Moore et al. | |
| 5,802,514 A * | 9/1998 | Huber | 715/769 |
| 5,974,407 A * | 10/1999 | Sacks | 707/2 |
| 5,987,506 A * | 11/1999 | Carter et al. | 709/213 |
| 6,192,131 B1 | 2/2001 | Geer, Jr. et al. | |
| 6,243,703 B1 * | 6/2001 | Couch et al. | 707/10 |
| 6,298,342 B1 * | 10/2001 | Graefe et al. | 1/1 |
| 6,407,761 B1 * | 6/2002 | Ching et al. | 715/835 |
| 6,411,313 B1 * | 6/2002 | Conlon et al. | 715/769 |
| 6,557,008 B1 | 4/2003 | Temple et al. | |
| 6,678,882 B1 | 1/2004 | Hurley et al. | |
| 6,684,383 B1 * | 1/2004 | Natori et al. | 717/107 |
| 6,732,122 B2 | 5/2004 | Zoltan | |
| 6,868,441 B2 | 3/2005 | Greene et al. | |
| 6,947,946 B2 * | 9/2005 | Nishikawa | 707/102 |
| 7,251,653 B2 * | 7/2007 | Huang et al. | 707/756 |
| 7,363,264 B1 * | 4/2008 | Doughty et al. | 705/35 |
| 2001/0048728 A1 | 12/2001 | Peng | |
| 2002/0019887 A1 * | 2/2002 | Moore | 709/328 |
| 2002/0165745 A1 | 11/2002 | Greene et al. | |
| 2002/0169650 A1 * | 11/2002 | Dougherty et al. | 705/8 |
| 2002/0178026 A1 | 11/2002 | Robertson et al. | |
| 2003/0091963 A1 * | 5/2003 | Fukushima | 434/118 |
| 2004/0010571 A1 * | 1/2004 | Hutchinson et al. | 709/220 |
| 2004/0143464 A1 * | 7/2004 | Houle et al. | 705/4 |
| 2004/0177339 A1 * | 9/2004 | Plaisted et al. | 717/116 |
| 2005/0050069 A1 * | 3/2005 | Vaschillo et al. | 707/100 |
| 2005/0060245 A1 * | 3/2005 | Hoffman et al. | 705/28 |
| 2005/0240572 A1 * | 10/2005 | Sung et al. | 707/3 |
| 2006/0026176 A1 | 2/2006 | Dettinger et al. | |
| 2006/0184568 A1 * | 8/2006 | Barcia | 707/103 R |
| 2007/0074130 A1 * | 3/2007 | Folting et al. | 715/792 |

OTHER PUBLICATIONS

Article from Think Customer Data entitled "Customer Data "Hubbing": Not Without Challenges" (45 pages).
Database Systems Concepts (Chapters 1-25).
Database Management Systems—Instructor; Raghu Ramakrishnan (366 pages).

(Continued)

*Primary Examiner* — Shahid Alam
*Assistant Examiner* — Dawaune Conyers

(57) ABSTRACT

In one of many possible embodiments, an exemplary system includes a data integration subsystem including at least one base hierarchical data structure representative of a first set of one or more data relationships. The system further includes a customization subsystem configured to receive one or more commands from an external source. The commands represent a second set of one or more data relationships, the second set of data relationships being externally defined. The customization subsystem is further configured to generate, based on the commands, a custom hierarchical data structure representative of the second set of data relationships, the second hierarchical data structure being generated on top of at least a subset of the base hierarchical data structure.

26 Claims, 7 Drawing Sheets

OTHER PUBLICATIONS

Article and PowerPoint slides entitled "Semantic Integration Research in the Database Community: A Brief Survey" by AnHai Doan and Alon Y. Harvey (35 total pages).

Taveter, et al., "Agent-Oriented Enterprise Modeling Based on Business Rules," 2001, pp. 527-540.

* cited by examiner

SYSTEMS AND METHODS FOR MANAGING INTEGRATED AND CUSTOMIZABLE DATA

BACKGROUND INFORMATION

A typical enterprise computing environment includes multiple heterogeneous and distributed databases supporting a variety of different enterprise organizations and systems. For example, many enterprises such as businesses and the like maintain different databases to support customer billing, sales, accounting, marketing, inventory, ordering, repairs, procurement, etc. Further, many enterprises are the result of a merger of two or more predecessors, each with their own set of heterogeneous, and distributed databases.

Common data is typically stored in some or all of the databases of an enterprise. However, the common data is often used for different business purposes and/or defined according to different local schemas (e.g., defined in different formats, according to different technologies, according to different data models, or according to different business rules). For example, different enterprise databases may use different local schemas to represent a customer and/or accounts associated with the customer. In addition, because enterprise databases often serve different business purposes, the relationships between customers and accounts may vary and/or be defined differently across the enterprise databases.

The diversity of an enterprise's databases creates challenges for the enterprise. For example, disparities between the local schemas employed by enterprise databases make it difficult, and often impossible, to ensure that data representing the same customers and accounts is created, maintained, and updated uniformly across all systems within the enterprise. The difficulty is increased when the enterprise systems include legacy databases that are limited in functionality as compared to more up-to-date database technologies.

The diversity of an enterprise's databases also places technical limitations on the ability of the enterprise to provide information and functionality to its customers. For example, a particular customer may desire to organize and view account information in a particular way that is not supported by the diverse databases in the enterprise. By way of one example, for a customer that includes multiple entities (e.g., subsidiaries), an enterprise billing system may organize customer data (e.g., customer account information) according to the legal relationships between the entities of the customer, but the customer may wish to view its account information according to a different organizational structure, such as by geographical region or by size of branch locations. A typical legacy database is unable to maintain its organizational data structure and fulfill a request for data organized according to a different structure. Accordingly, conventional enterprise computing environments may allow customers to access account information organized in a particular way, but the customers are unable to re-organize the account information.

Disparities between enterprise databases may also make it difficult to fulfill customer requests to view account information organized in a way that requires data to be retrieved from more than one enterprise database, especially when the enterprise databases from which the data will be retrieved employ different organizational structures than the organizational structure requested by the customer. Accordingly, customers may be unable to manage their accounts as they desire or as will best serve their business purposes. Such situations are especially common and problematic for enterprise-level customers that have complicated business structures and purposes.

Currently, enterprises may expend considerable resources to manually create custom organizations and views of data desired by customers. Typically, one or more employees of an enterprise spends significant time manually gathering data from the diverse enterprise databases and organizing the data according to the organizational structures requested by customers. However, such a solution quickly becomes impractical for a large enterprise maintaining significant amounts of data and/or when considerable numbers of different organization data structures and views are requested by customers.

Despite the foregoing difficulties associated with an enterprise operating diverse databases, there are many reasons why multiple heterogeneous and independent databases may exist within an enterprise. Where databases were created using different technologies or different data models, there may be considerable disruption to the enterprise, not to mention considerable time and expense, in migrating the multiple databases to the same technology platform. Accordingly, in many cases it is simply impossible, or at least impractical, for an enterprise to integrate its multiple heterogeneous and independent databases. Further, the risk of committing the entire enterprise to a single technology platform is unacceptable to many enterprises, given the possibilities that, for a given technology platform, vendors may go out of business, properly experienced staff may be unavailable, the technology may not prove to be robust or adequate to the needs of the enterprise, etc. Moreover, from the standpoint of resisting and recovering from disasters, it is advantageous for an enterprise to have multiple databases that are widely dispersed geographically and/or in terms of technology platforms, business units, etc.

Accordingly, there is a need for systems and methods that provide customers with one or more tools for managing data, including defining custom hierarchical structures of data without impacting or being limited by the internal requirements of diverse databases.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Figure 1:
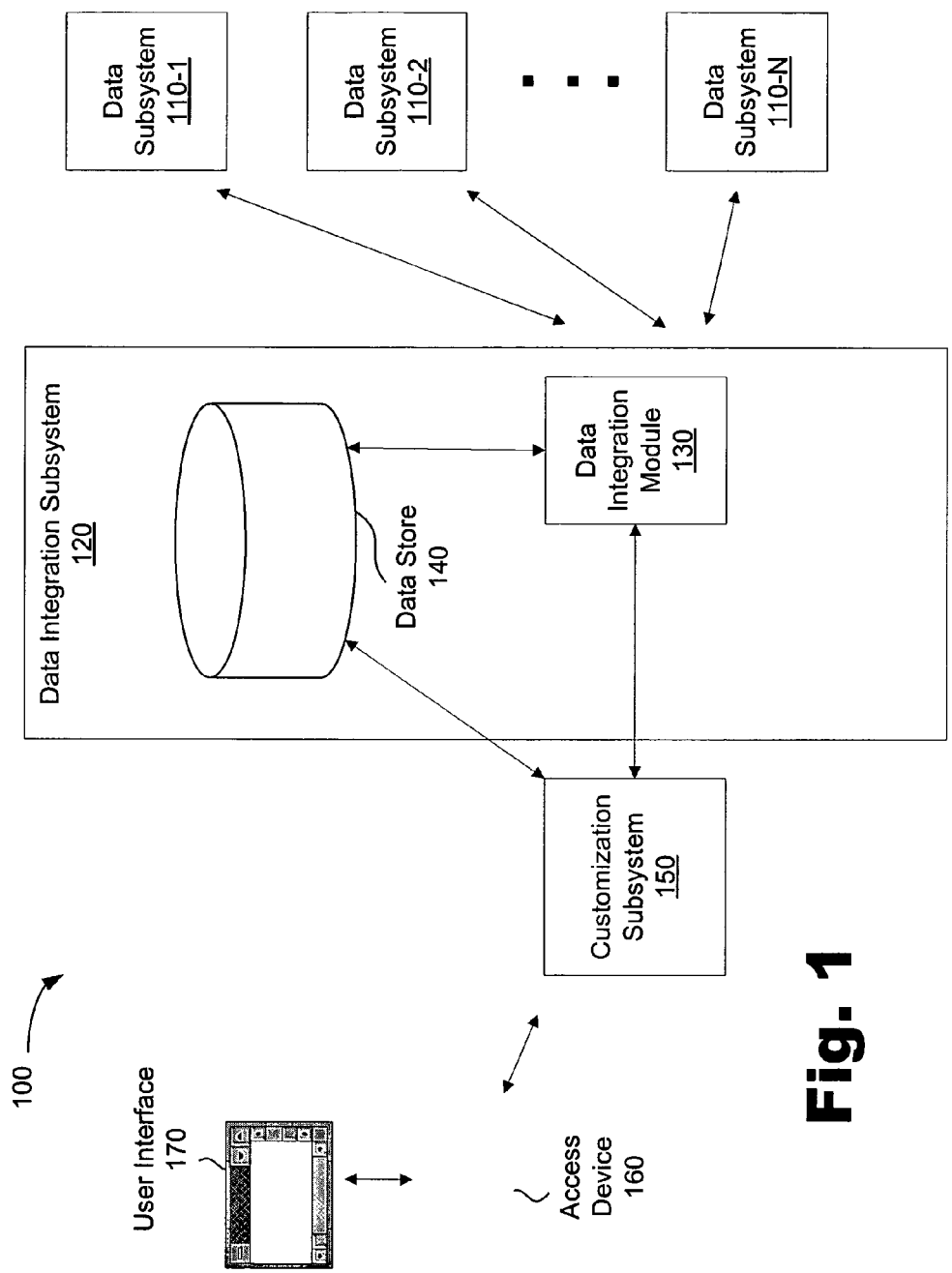
FIG. 1 is a block diagram illustrating an exemplary data management system, according to an embodiment.

Preferred embodiments may be implemented as data management systems and methods. The systems and methods provide one or more tools by which users (e.g., users associated with customers of an enterprise) can flexibly and conveniently manage data maintained by an enterprise, including data stored across heterogeneous data subsystems of the enterprise. In certain embodiments, the tools enable users to define custom groupings of customer accounts, without impacting or being limited by the internal requirements associated with the heterogeneous data subsystems maintained by the enterprise. The custom groupings of accounts may be represented as custom hierarchical data structures representative of one or more relationships between customer data records, including relationships of customer accounts with customer entities and/or user-defined records. Accordingly, customers are able to conveniently provide new data relationships that define custom groupings of customer data.

In certain examples, "global data" is mapped from "local data" stored across heterogeneous data subsystems of an enterprise. The global data includes one or more base data hierarchical structures associated with one or more customers of the enterprise. Each base data hierarchical structure represents a first set of data relationships between customer entities and customer accounts. For example, a particular base data hierarchical structure may be organized to represent legal relationships between different entities of a customer as well as relationships between customer accounts (i.e., subscriptions) and the customer entities.

The first set of data relationships represented in the base hierarchical structures of the global data may represent local data relationships defined in the local data of the heterogeneous data subsystems. That is, at least some of the data relationships in the local data may be conglomerated, homogenized, and maintained in the global data. The global data may be fixed in that customers are prevented from changing the first set of data relationships without assistance or authority from an enterprise administrator of the global data. This feature serves to protect the integrity between the local data and the first set of relationships represented in the global data, while providing customers with capabilities for defining custom data relationships (i.e., custom groupings of customer accounts).

With the global data in place, customers are able to define custom data relationships, including custom groupings of accounts, on top of the base hierarchical structures included in the global data. A customer may be authorized to operate on only the base hierarchical data structure(s) associated with the customer. Through a user interface, a user associated with a customer may provide commands defining new custom data relationships. An exemplary system receives the commands and, based on the commands, generates, on top of a base hierarchical data structure, a new custom hierarchical data structure that is representative of the custom data relationships. In this manner, the user is able to define a custom grouping of one or more customer accounts as may serve the desires or business purposes of the customer. Because a custom hierarchical data structure representing custom data relationships is generated on top of a base hierarchical structure, the fixed first set of data relationships represented in the base hierarchical data structure is unchanged when the user defines a second set of data relationships, even when the second set of data relationships references some of the same data records (e.g., customer account records) referenced by the first set of data relationships. Accordingly, the user can flexibly and conveniently define new custom groupings of customer accounts that are not limited by the internal requirements associated with the local data stored in the heterogeneous data subsystems.

As used herein, the term "enterprise" refers to an organization providing one or more services and/or products to customers. An enterprise typically maintains and/or operates multiple heterogeneous data subsystems to store data, including data associated with the customers. The term "customer" refers to any individual or organization receiving, or contracting to receive, one or more products and/or services from the enterprise. Customers can be of different types, including, for example, enterprise-level customers having subsidiary entities. The subsidiary entities may also be customers of the enterprise. The term "customer" is also used to refer to an individual associated with a customer entity, including an owner, officer, or employee of a customer company. The term "user" may also refer to an individual associated with a customer entity. The term "subscriber" is used interchangeably with the term "customer."

As used herein, the term "internal party" may be used to refer to an enterprise as defined above, and the term "external party" may be used to refer to a customer of the enterprise, as defined above. However, the terms "internal party" and "external party" are not limited to these definitions. "Internal party" may refer to any party (e.g. organization or individual) operating and/or maintaining the exemplary systems described herein. "External party" may refer to any party (e.g., organization or individual) that is granted external access (rather than internal access) to the exemplary systems described herein.

Components and functions of exemplary embodiments of data management systems and methods will now be described in detail.

II. Exemplary System View

FIG. 1 illustrates an example of a data management system 100 (or simply "the system 100"), according to an embodiment. As shown in FIG. 1, the system 100 may include data subsystems 110-1 through 110-N (collectively the "data subsystems 110") communicatively coupled to a data integration subsystem 120 having a data integration module 130 and a data store 140. The system 100 further includes a customization subsystem 150 communicatively coupled to the data integration subsystem 120 and also configured to communicate with an access device 160 that is configured to present a user interface 170 for consideration of a user of the access device 160.

The elements of the system 100 may communicate using any known communication technologies, devices, media, and protocols supportive of data communications, including, but not limited to, the Internet, intranets, local area networks, other communications networks, data transmission media, communications devices, Transmission Control Protocol ("TCP"), Internet Protocol ("IP"), File Transfer Protocol ("FTP"), telnet, Hypertext Transfer Protocol ("HTTP"), socket connections, Ethernet, data bus technologies, and other suitable communications technologies. At least some of the communications between the data subsystems 110 and the data integration subsystem 120 as carried out in certain embodiments are described in co-pending patent application Ser. No. 11/443,364, entitled "Asynchronous Data Integrity For Enterprise Computing," filed the same day as the present application and hereby fully incorporated herein by reference in its entirety (hereinafter referred to as "the Data Integrity Application").

In certain embodiments, the elements of the system 100 are implemented in one or more computers. The system 100 may include any computer hardware and/or instructions (e.g., software programs), or combinations of software and hardware, configured to perform the processes described herein. In particular, it should be understood that the system 100 may be implemented on more than one physical computing device. Accordingly, the system 100 may include any one of a number of well-known computing devices (e.g., one or more servers), and may employ any of a number of well-known computer operating systems, including, but by no means limited to, known versions and/or varieties of the Microsoft Windows® operating system, the Unix operating system, and the OS/390 operating system. The system 100 may also employ any of a number of well-known database management tools, including, but not limited to, known versions and/or varieties of Microsoft SQL Server sold by Microsoft Corporation of Redmond, Wash. and DB2 sold by International Business Machines Corporation of Armonk, N.Y.

Accordingly, the processes described herein may be implemented at least in part as instructions executable by one or more computing devices, as is well known. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1, the exemplary components illustrated in the Figure are not intended to be limiting. Indeed, other alternative hardware environments and implementations may be used, as is well known. Each of the components of the system 100 will now be described in additional detail.

A. Access Device

The access device 160 may include any device physically or remotely accessible to one or more users (e.g., users associated with a customer of an enterprise) and that allows a user to provide input to and receive output from the customization subsystem 150. For example, the access device 160 can include, but is not limited to, one or more desktop computers, laptop computers, tablet computers, personal computers, personal data assistants, cellular telephones, satellite pagers, wireless internet devices, embedded computers, video phones, network interface cards, mainframe computers, mini-computers, programmable logic devices, vehicles, and any other devices capable of communicating with the customization subsystem 150. The access device 160 can also include various peripherals such as a terminal, keyboard, mouse, screen, printer, stylus, input device, output device, or any other apparatus that can help a user interact with the access device 160.

The access device 160 may be communicatively coupled to the customization subsystem 150 using any suitable communication technologies, including any of the communication technologies listed above. In certain embodiments, the access device 160 and the customization subsystem 150 are configured to communicate via the Internet or World Wide Web, as is well known.

The access device 160 provides external access to the customization subsystem 150 and consequently to the data integration subsystem 120 via the customization subsystem 150. Accordingly, the access device 160 and/or any individuals and/or organizations (e.g., a customer as defined above) associated with the access device 160 may be referred to as external sources of input to the customization subsystem 150. For example, one or more users associated with a customer of an enterprise (e.g., a subscriber to services and/or products provided by the enterprise) may utilize the access device 160 to provide requests to and receive output from the customization subsystem 150. In particular, users are able to use the access device 160 to provide externally-defined data management commands to the customization subsystem 150. As described below, the commands may define custom data relationships such as custom groupings of customer accounts, for example. Output from the customization subsystem 150 may include representations (e.g., graphical views) of custom hierarchical data structures representative of the custom data relationships. The access device 160 can present the views in the user interface 170.

The access device 160 may include instructions for generating and operating the user interface 170. The instructions may be in any computer-readable format, including software, firmware, microcode, and the like. When executed by a processor (not shown) of the access device 160, the instructions may present the user interface 170 to a user of the access device 160.

While FIG. 1 shows a single access device 160, this is only illustrative. One or more access devices 160 may communicate with the customization subsystem 150 and benefit from messages and/or data provided by the customization subsystem 150.

B. User Interface

The access device 160 may present the user interface 170 to a user as a way for the user to initiate communications with and/or consider output from the customization subsystem 150. The user interface 170 may be equipped to present information to and receive input from users. As described below, for example, the user interface may present data management tools and representations of hierarchical data structures to a user of the access device 160.

The user interface 170 may comprise one or more graphical user interfaces ("GUI") capable of displaying information and receiving input from users. In certain exemplary embodiments, the user interface 170 includes a web browser, such as Internet Explorer® offered by Microsoft Corporation of Redmond, Wash.

However, the user interface 170 is not limited to a web form embodiment and may include many different types of user interfaces that enable users to utilize the access device 160 to communicate with the customization subsystem 150. In some embodiments, for example, the user interface 170 may include a voice interface capable of receiving input from and providing output to a user. Further, the user interface 170 may accept various types of input from users. Merely by way of example, the user interface 170 may include voice recognition applications.

C. Data Subsystems

The data subsystems 110 may include computing devices and data management applications configured to store electronic data that may be referred to as "local data." Each of the data subsystems 110 may include one or more databases or other data storage technologies, as is well known.

The data subsystems 110 typically maintain local data for different organizations or purposes of an enterprise. Without limitation, each of the data subsystems 110 may be associated with customer billing, sales, accounting, marketing, inventory, ordering, repairs, procurement, or other purpose or organization of the enterprise. In addition, each of the data subsystems 110 may be associated with different entities (e.g., subsidiaries) or geographic areas served by the enterprise.

One or more of the data subsystems 110 may store local data that is common to one or more other data subsystems 110. Examples of local data that may be stored by the data subsystems 110 include, but are not limited to, customer identifiers (e.g., customer names and codes), customer type identifiers, customer account identifiers (e.g., account numbers), customer account type identifiers, service identifiers, and service type identifiers (e.g., Plain Old Telephone Services ("POTS"), long distance services, Voice over Internet Protocol ("VoIP") services, wireless telephone services, data services, network access services (e.g., Internet access services, Digital Subscriber Line ("DSL") services, optical fiber services, content delivery services (e.g., delivery of video, audio, or multimedia content), financial services, credit card services, banking services, communication services, Asynchronous Transfer Mode ("ATM") circuits, and any other type of service that may be provided by an enterprise). Local data may also include, but is not limited to, service status identifiers (e.g., "Active" and "Terminated"), geographical region identifiers, addresses, dates (e.g., a date service was initiated or an account opened), service or account expiration dates, group identifiers (e.g., identifiers for a particular group of accounts or customers), and backend subsystem identifiers (e.g., identifiers indicative of the particular data subsystems 110).

Typically, the different data subsystems 110 are heterogeneous. For example, one or more of the data subsystems 110 may store data according to different data schemas (e.g., according to different technologies, formats, data models, or business rules) than the schemas used by the other data subsystems 110. For example, data subsystem 110-1 may employ a first data schema, data subsystem 110-2 may employ a second data schema, and data subsystem 110-N may employ another data schema. The data schemas may be proprietary, open, or a combination thereof.

The local data may be representative of relationships between information (e.g., customer entities and accounts) associated with customers. For example, relationships between customer entities and/or customer accounts may be represented as local data relationships (e.g., local hierarchical data structures) in the data subsystems 110. Because of the heterogeneous nature of the data subsystems 110, the data relationships represented by the local data are often different across different data subsystems 110, even for the same customer. The differences may be due to different business purposes, which lead to the organization of data according to different business rules across the different data subsystems 100. By way of an example, different business rules may dictate that a new account be added to a particular data subsystem 110 used for ordering purposes well in advance of the new account being added to a different data subsystem 110 used for billing purposes.

As described below, the local data stored in the data subsystems 110 may be mapped to "global data," which is stored at the data integration subsystem 120.

D. Data Integration Subsystem

The data integration subsystem 120 may include any device or combination of devices and communication technologies useful for communicating with the customization subsystem 150 and the data subsystems 110. The data integration subsystem 120 may also include any device or combination of devices and data storage and processing technologies useful for storing and processing data, including "global data" that is mapped from the local data, or at least a subset of the local data, stored at the data subsystems 110.

The global data may be mapped from the local data and stored at the data integration subsystem 120 in a manner that maintains the behaviors and properties of the local data, including the data relationships represented in the local data. As will be understood from this description, mappings between the local data and the global data may be defined based on local data models, other properties of the local data, and as may serve a particular implementation. Mappings between the local data and the global data may also be based on a global data model, an example of which is described further below. Accordingly, a mapping can represent any suitable relationship between local data and global data that preserves the properties of the local data (or at least certain select properties of the local data) and is in accordance with a global data model.

Mappings may be defined in any suitable manner, including one or more persons (e.g., system administrators or operators) associated with an enterprise manually defining mappings based on the properties and specifications of the local data stored in the data subsystems 110 and on a global data model. The mappings may be used in subsequent processing to automatically translate between the local data and the global data. The global data may be stored in the data store 140.

1. Data Store

Data store 140 may include one or more data storage mediums, devices, or configurations and may employ any type, form, and combination of well-known storage media, including hard disk drives, read-only memory, caches, databases, optical media, and random access memory. Data store 140 may include any known technologies useful for storing, updating, modifying, accessing, retrieving, and deleting data.

As mentioned above, the global data may be stored in the data store 140 and may include global representations of the local data, or at least a portion of the local data, stored in the data subsystems 110. The global data may include, but is not limited to, customer records (also referred to as "subscriber records"), account records (also referred to as "subscription records"), customer identifiers, customer account identifiers, relationship records (i.e., map records) indicative of relationships between global data records (e.g., between customer and account records), relationship type identifiers indicative of the types of relationships between global data records, and any information included in the local data. Global data records are assigned unique identifiers that enable the global data to be used across the system 100.

The global data includes representations of relationships between customer information. For example, the global data may represent relationships between customer accounts and customer entities. In certain embodiments, the global data represents relationships between customer accounts and different customer entities, which may be organized in accordance with the legal relationships between the entities. Accordingly, the global data may represent initial groupings of customer accounts, where the accounts are organized in relation to different customer entities (including hierarchies of customer entities). The relationships represented by the global data may be referred to as a first set of data relationships or a fixed set of data relationships, where fixed means that a customer is prevented from changing the fixed data relationships. Because the first set of data relationships included in the global data may be representative of data relationships included in the local data, the global data (or at least subsets of the global data) can be used as the basis for the creation and representation of new custom data relationships, as described further below.

The data relationships in the global data may be represented by one or more hierarchical data structures (also referred to as "data hierarchies") of global data records. The hierarchical data structures, which may be referred to as "base hierarchical data structures," include and/or are representative of one or more local hierarchical data structures represented in the data subsystems 110. As used herein, the terms "data hierarchical structure" and "data hierarchy" both refer to a hierarchical relationship of data records to one another. For example, an association of an account data record to a customer data record forms a simple hierarchical data structure. Of course, other hierarchical data structures may be more complex. Examples of several hierarchical data structures will be described below in relation to FIGS. 2-6.

2. Data Integration Module

The data integration subsystem 120 may be configured to maintain the global data such that the global data continues to accurately reflect the local data in the data subsystems 110. For example, updates to the local data may be carried through to the global data in accordance with one of more predefined mappings between the global and local data. In other words, global and local data can be synchronized. The integrity of the global data may also be checked and maintained in relation to the local data. The global data may be maintained in any suitable way, including operators of the system 100 manually updating the global data to reflect changes in local data, or by automatically carrying changes to local data through to the global data using automatic translation tools.

The data integration module 130 may be configured to automatically translate data between a global data model implemented in the data integration subsystem 120 and any of the local data models used by the data subsystems 110. In particular, the data integration module 130 may include one or more agents (e.g., software applications) that are configured to coordinate with local agents associated with the data subsystems 110 to translate data between the global data model and the local data models. Translation functions may be performed in accordance with one or more predefined mappings between local and global data. The mappings may be defined as described above and may be maintained at the data integration subsystem 120. Data translation functions, including, but not limited to, messaging, prioritization, update, synchronization, and integrity checking functions, may be carried out in any of the ways and using any of the technologies described in the Data Integrity Application referenced above and already fully incorporated herein by reference in its entirety. Accordingly, the global data stored at the data integration subsystem 120 can accurately represent over time the local data stored at the data subsystems 110.

3. Global Data Model

As mentioned above, the global data may be defined in accordance with a global data model. The global data model may include any rules and definitions descriptive of how data can be represented and that enable the global data to be represented in a manner that both accurately reflects local data at a global level and supports the creation of custom hierarchical data structures on top of one or more base hierarchical data structures represented in the global data. The global data model may include any suitable rules, properties, and characteristics that support these features.

In certain embodiments, global data records are defined having unique identifiers that can be used across the system 100. The global data records, as well as relationships between the global data records, are defined such that the data records and relationships can be used across the system 100. The relationships between global data records are represented as one or more global hierarchical data structures, which generally include or represent at least a subset of the local data relationships represented in the local data.

From the base hierarchical structures of data included in the global data, customers are able to define custom relationships between global data records to create one or more custom hierarchical data structures, without changing or otherwise affecting the base hierarchical data structures reflective of local data relationships. Consequently, the system 100 can generate views of customer-defined hierarchical data structures for customers while still maintaining initial data relationships in accordance with internal requirements associated with the data subsystems 110. For example, a customer can use the system 100 to define new data relationships representative of a new grouping of customer accounts, and the system 100 is able to generate a data structure representative of the new grouping and/or the new data relationships.

In certain embodiments, the global data is mapped from the local data such that the mapped global data includes the exemplary data records and structures described below. The data records and structures are defined in accordance with an exemplary global data model in a manner that enables new custom data relationships to be defined by customers and generated on top of the mapped data records and structures. Before describing exemplary customizations of customer information (e.g., groupings of customer accounts), exemplary global data records and relationships included in the global data will now be described. The exemplary global data records and relationships may be used as a base on top of which custom data relationships can be defined by a customer.

a. Subscriber Records

As defined above, the term "subscriber" refers to an entity (e.g., an individual or an organization such as a business) that receives, or contracts to receive (i.e., subscribes to) services or products provided by an enterprise. Subscribers may be assigned to different subscriber categories based on any suitable attributes associated with the subscribers and/or the products or services provided to the subscribers.

The data subsystems 110 include local subscriber records representative of subscribers and information associated with the subscribers. As mentioned above, the data subsystems 110 are typically designed for different and inconsistent local data models. Accordingly, the local subscriber records maintained by one of the data subsystems 110 may not be readily compatible with the local subscriber records of another one of the data subsystems 110. Moreover, the local subscriber records of different data subsystems 110 may include inconsistent information such as different subscriber naming conventions, different subscriber name field labels and attributes, different subscriber address field labels and attributes, and different addresses for subscribers, for example.

In certain embodiments, the data subsystems 110 include local subscriber identifiers having different formats. For example, data subsystem 110-1 may use a first local subscriber identifier format, data subsystem 110-2 may use a second local subscriber identifier format, and data subsystem 110-N may use another local subscriber identifier format. Each of the local subscriber identifier formats may be associated with specific attributes or behaviors. The formats may be proprietary, open, or a combination thereof. Examples of local subscriber identifier formats include, but are in no way limited to, numeric codes of various lengths (e.g., a nine-digit D-U-N-S® code, which is well known) and alphanumeric codes of various lengths (e.g., an eleven-character alphanumeric code or an eight-character alphanumeric abbreviated description).

Global subscriber records are mapped from corresponding local subscriber records. For example, a global subscriber record can be defined to represent a particular subscriber, including a subscriber that has multiple different local subscriber records across different data subsystems 110. Global subscriber records may be represented as data objects or any suitable data structures and may include global subscriber identifiers, global subscriber descriptors, subscriber type identifiers, subscriber status identifiers, and any other information associated with subscribers.

The global subscriber records are assigned subscriber descriptors that are unique across the system 100. The global subscriber records may be defined in a manner that avoids duplication of records for the same subscriber. In certain embodiments, each of the global subscriber descriptors includes a combination of one or more local subscriber record identifiers that is/are used to refer to the same subscriber. In some cases, the global subscriber descriptors may be defined to identify which of the database subsystems 110 include local data for the corresponding subscriber. Because local subscriber identifiers can be different formats, the subscriber descriptors at the global level may have different formats and lengths.

The global subscriber descriptors may be configured to exist when the corresponding subscribers have subscriptions with the enterprise. Accordingly, a global subscriber descriptor can be expired when the corresponding subscriber no longer has a subscription with the enterprise.

A global subscriber identifier ("subscriber ID") may be assigned to each unique global subscriber descriptor. Accordingly, the global subscriber identifiers can be associated with and used to identify global subscriber records. The global subscriber identifiers may have a consistent format and length, which helps to reduce processing demands that would be normally associated with processing variable length and format data fields.

Other information associated with local subscriber records (e.g., local subscriber addresses) may also be translated into global data. For example, the global subscriber records may be defined to include one or more addresses associated with the corresponding subscribers. The different database subsystems 110 may be prioritized and the priorities used to determine which of the addresses associated with a subscriber is used as the primary address in a global subscriber record. The other addresses associated with the subscriber may be included in the subscriber record as alternative addresses.

b. Subscriber Hierarchies

Figure 2:
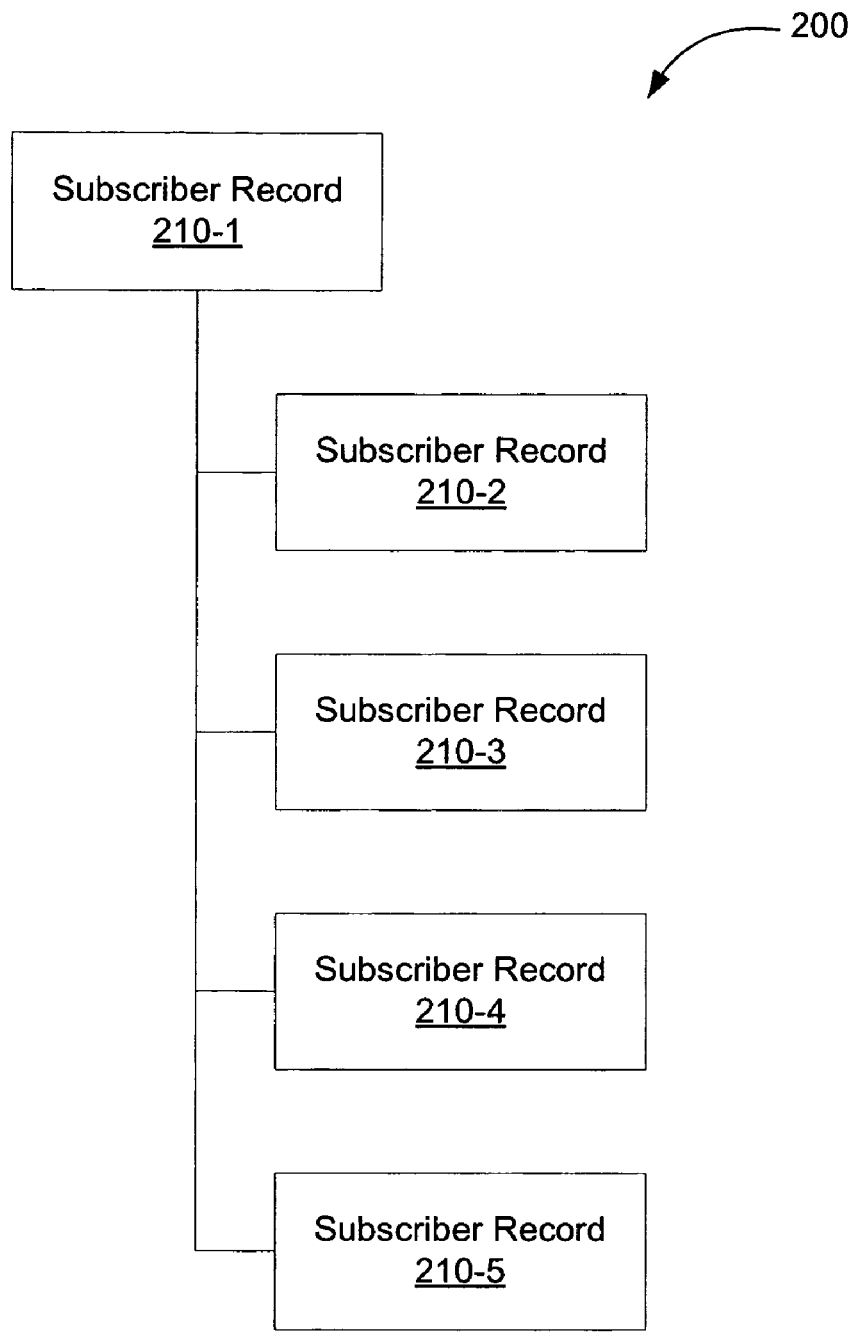
FIG. 2 illustrates an exemplary hierarchical structure of subscriber records, according to an embodiment.

Certain subscribers are related to one another. For example, subscribers may be subsidiaries of a top-level subscriber such as an enterprise-level customer. Relationships between subscribers, including local relationships between subscribers represented in the local data, may be modeled and represented in the global data as global subscriber records and relationships between the subscriber records. Representations of subscriber records in relation to one another may be referred to as subscriber hierarchies or subscriber hierarchical data structures. FIG. 2 illustrates an exemplary subscriber hierarchical data structure 200 (also referred to as "the subscriber hierarchy 200), according to an embodiment. As shown in FIG. 2, a top-level subscriber represented by subscriber record 210-1 may have four subsidiaries represented by subscriber records 210-2 through 210-5, respectively.

The subscriber hierarchy 200 may be representative of legal relationships between subscribers associated with subscriber records 210-1 through 210-5. For example, a subscriber associated with subscriber record 210-1 may be a parent company of the subscribers associated with subscriber records 210-2 through 210-5. Of course, subscriber hierarchical data structures may be defined to represent other suitable types of relationships between subscribers.

Subscriber entities and the legal relationships between subscriber entities may be determined in any suitable manner and/or using any suitable technology. In certain embodiments, subscriber information, including legal relationships between subscribers, is obtained from one or more third-party marketing lists as is well known. For example, one or more marketing lists can be obtained (e.g., purchased) from third parties such as The D&B Corporation having a place of business in Short Hills, N.J. From information (e.g., corporate names and organizations) included in a marketing list and local data stored in the data subsystems 110, a subscriber hierarchical data structure such as subscriber hierarchy 200 can be defined in the global data. In certain embodiments, subscriber hierarchical data structures are manually defined in the global data.

By way of one example, subscriber record 210-1 may include information obtained from a marketing list for a top-level subscriber contracted to receive a service or product from an enterprise. The top-level subscriber is usually an enterprise-level organization having one or more subsidiaries. Subscriber records 210-2 through 210-5 may represent four different subsidiaries of the top-level subscriber. In FIG. 2, the lines connecting subscriber record 210-1 to the subscriber records 210-2 through 210-5 represent legal relationships between the entities represented by the subscriber records 210-1 through 210-5.

A global subscriber record (e.g., subscriber record 210-1) may be created and assigned any suitable unique global identifier. In certain embodiments, a D-U-N-S® number provided by The D&B Corporation having a place of business in Short Hills, N.J. is used when available for a subscriber. Of course, other suitable identifiers may be used. For example, unique identifiers may be defined for entities not having D-U-N-S® numbers.

Each link between two subscriber records may define a relationship between the corresponding subscribers. A link between two subscriber records may be referred to as a subscriber map record, which may be represented in any suitable data structure. In certain embodiments, a subscriber map record includes a unique subscriber map record identifier and two subscriber identifiers associated with two subscriber records defined as having a parent-child relationship. A subscriber map record may also include a relationship identifier that has been predefined as identifying a parent-child relationship and/or allowable types of subscriber relationships. A data table may be defined to include one or more subscriber map records identifying one or more pairs of subscriber records that have a parent-child relationship. Accordingly, combinations of subscriber records and subscriber map records can represent subscriber hierarchical data structures (e.g., subscriber hierarchy 200) in the global data.

Information included in the local data at the data subsystems 110 may be defined at the global data level in relation to subscriber hierarchies such as subscriber hierarchy 200. That is, local data may be mapped to any particular subscriber hierarchy in accordance with local relationships defined in the local data. For example, subscriber accounts included in the local data can be defined at the global level and associated with corresponding subscriber records 210, as described below. With respect to the subscriber represented by subscriber record 210-1, for instance, local data associated either directly or indirectly with the subscriber may be defined, at the global level, as having a relationship to the subscriber hierarchical data structure 200. In this manner, local data can be homogenized and properties and behaviors of the local data maintained at the global data level. Local data from multiple different data subsystems 110 may be defined as being related to a particular subscriber hierarchical data structure such as the subscriber hierarchical data structure 200.

c. Subscription Records

The term "subscription" refers to a contract or agreement between a subscriber and an enterprise for the purchase and sale of one or more services or products. Each subscriber may have one or more subscriptions with the enterprise. Many subscribers have numerous subscriptions.

Subscriptions may be assigned to different categories based on the types of services or products provided by the enterprise. For example, subscriptions may be for telephone services, data services, network access services, content delivery services, or different types of services. Examples of accounts for different services include, without limitation, accounts for phone and/or data services and accounts for aggregation of the former.

The data subsystems 110 include local subscription records representative of subscriptions and information associated with the subscriptions. For the same reasons described above, the local subscription records maintained by one of the data subsystems 110 may not be readily compatible with the local subscription records of another one of the data subsystems 110. Moreover, the local subscription records of different data subsystems 110 may include inconsistent information such as different subscription definitions, different subscription field labels and attributes, and different subscription address field labels and attributes, for example.

In certain embodiments, the data subsystems 110 include local subscription definitions having different formats. For example, data subsystem 110-1 may use a first local subscription definition format, data subsystem 110-2 may use a second local subscription definition format, and data subsystem 110-N may use another local subscription definition format. Each of the local subscription definition formats may be associated with specific attributes or behaviors. The formats may be proprietary, open, or a combination thereof. In certain embodiments, some of the local subscription definitions include an attribute identifying the types of service associated with the subscriptions. This attribute may be referred to as a service type attribute.

Global subscription records are mapped from corresponding local subscription records. For example, a global subscription record can be defined to represent a subscription, including a subscription represented by multiple different local subscription records across different data subsystems 110. The global subscription records may be represented as data objects or any suitable data structures and may include representations of global subscription identifiers, global subscription descriptors, subscription type identifiers (e.g., service type identifiers), subscription status identifiers, and any other information associated with subscriptions.

In certain embodiments, the global subscription records are assigned subscription descriptors that are unique across the system 100. For example, each of the subscription descriptors may be a combination of one or more local attributes and/or identifiers used by specific data subsystems 110 to represent the same subscription. In some cases, the global subscription descriptors may be used to identify which of the database subsystems 110 include local data for the corresponding subscription. Because local subscription definitions are represented in different formats, the subscription descriptors at the global level may have different formats and lengths.

In certain embodiments, each of the global subscription descriptors is a combination of an identifier associated with the database subsystem 110 storing the corresponding local subscription record, a service-type attribute indicative of the type of service associated with the subscription record, and a subscriber account identifier. The subscriber account identifier may be defined by capturing and remodeling inconsistent local account definitions for each of the database subsystems 110. The local account definitions may be remodeled as composite key columns of a table or in any other suitable manner. Because of the differences between the local data models of the database subsystems 110, the subscriber account identifier may have different formats and lengths.

A global subscription identifier ("subscription ID") may be assigned to each unique subscription descriptor. Accordingly, the global subscription identifiers can be associated with and used to identify corresponding global subscription records. The global subscription identifiers may have a consistent format and length, which helps to reduce processing demands that would be normally associated with processing variable length and format data fields.

The subscription records may each be configured to include a status identifier representative of the status of the corresponding subscription. For example, the subscription records may indicate whether subscriptions are "active" or "disconnected."

Any information stored in the local data and related to subscriptions (e.g., addresses associated with local subscriptions) may be mapped into the global data. For example, the global subscription records may be defined to include one or more addresses associated with the corresponding subscriptions. In certain embodiments, the primary address associated with a subscription record is defined to be the primary address included in the subscriber record associated with subscription record. Other addresses associated with a subscription may be included in the subscription record as alternative addresses.

Other information that may be mapped from the local data to the global data includes, but is not limited to, telephone numbers, account identifiers, billing codes, dates associated with services, billing dates, geographic identifiers (e.g., area codes and zip codes), subscriber names and descriptions, descriptions of services and products, service type identifiers, subscriber type identifiers, and accounting revenue categories (e.g., an accounting ledger to which the revenue of an account is associated).

Alternatively, any information included in the local data may be stored in one or more electronic data stores that are communicatively coupled to the data integration subsystem 120 such that the data integration subsystem 120 may communicate with the electronic data stores in relation to processing a user query for information that is not found in the data integration subsystem 120. For example, extensive billing information may be stored in an external electronic data store, which may be queried by the data integration subsystem 120 when a user submits a query for billing-related information not stored at the data integration subsystem 120. One or more data subsystems 110 may be configured to serve as the electronic data stores that can be queried by the data integration subsystem 120. User queries will be described in more detail further below.

d. Subscription Hierarchies

Figure 3:
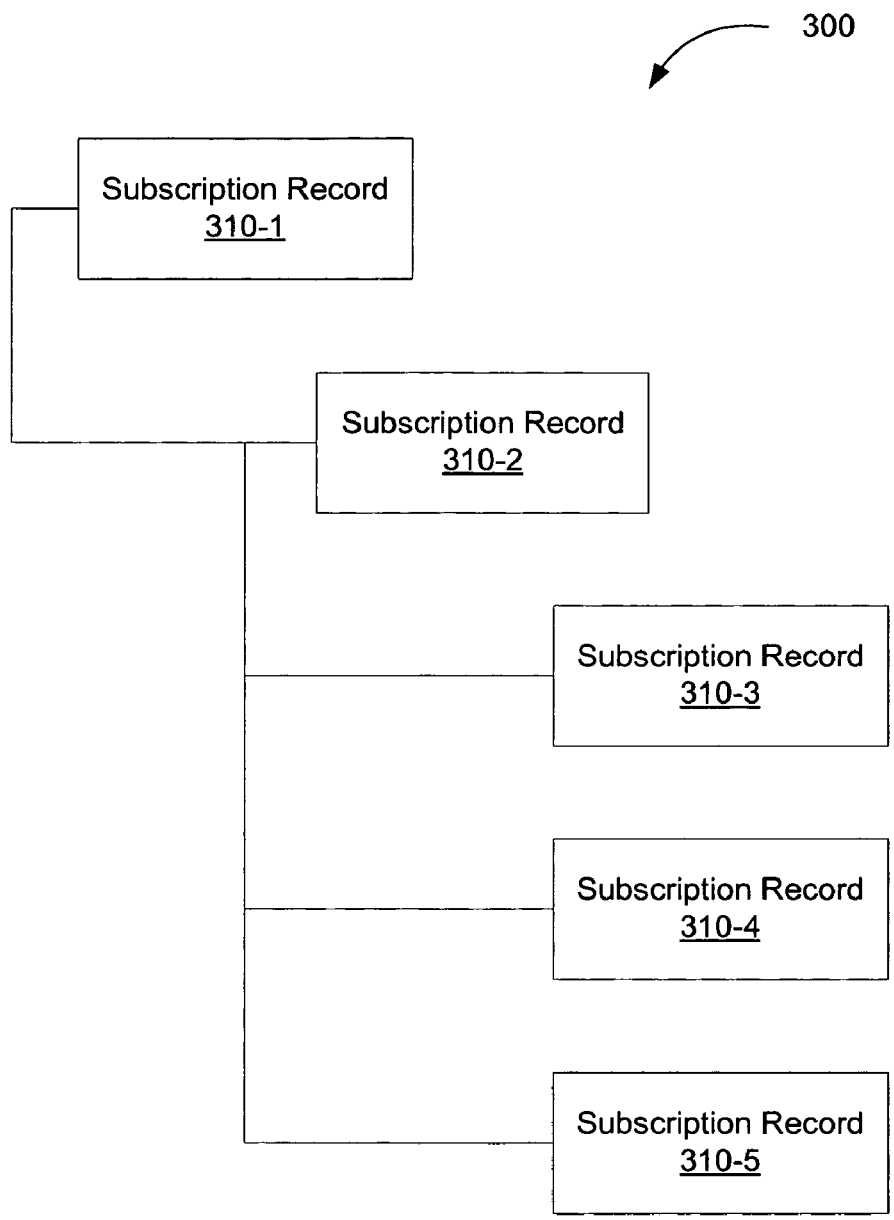
FIG. 3 illustrates an exemplary hierarchical structure of subscription records, according to an embodiment.

Certain subscriptions are related to one another. For example, subscriptions (e.g., billing telephone accounts) may be part of a top-level subscription (a summary of billing telephone accounts). Relationships between subscriptions may be modeled and represented in the global data. The representations of relationships of subscriptions to one another may be referred to as subscription hierarchies or subscription hierarchical data structures. FIG. 3 illustrates an exemplary subscription hierarchical data structure 300 (also referred to as "subscription hierarchy 300"), according to an embodiment. As shown in FIG. 3, a top-level subscription represented by subscription record 310-1 may have a child subscription represented by subscription record 310-2, which may have three children subscriptions represented by subscription records 310-3 through 310-5.

Each link between two subscription records may define a relationship between the corresponding subscriptions. A link between two subscription records may be referred to as a subscription map record, which may be represented in any suitable data structure. In certain embodiments, a subscription map record includes a unique subscription map record identifier and two subscription identifiers associated with two subscriptions having a parent-child relationship. A subscription map may also include a relationship identifier that has been predefined as identifying a parent-child relationship and/or allowable types of subscription relationships. A data table may be defined to include one or more subscription map records identifying one or more pairs of subscription records that have a parent-child or other type of relationship. Accordingly, combinations of subscription records and subscription map records can represent subscription hierarchies such as subscription hierarchy 300.

Subscription hierarchies may be defined at the global level to represent relationships between subscriptions as represented in the local data of the data subsystems 110. Subscription relationships from different data subsystems 110 can be combined in a manner that maintains different local definitions of subscription relationships. For example, a first local subscription hierarchy and a second local subscription hierarchy associated with the same top-level subscription can both be included in an overall global subscription hierarchy for the top-level subscription. The global subscription record representative of the top-level subscription may be assigned any suitable unique identifier. In this manner, subscription information included in the local data can be homogenized at the global level.

e. Subscriber-Subscription Hierarchies

Certain subscriptions are related to certain subscribers. For example, one or more subscriptions (e.g., billing telephone accounts) may be tied to a subscriber in the local data. Relationships between subscriptions and subscribers in the local data may be mapped to and represented in the global data as relationships between subscriber records and subscription records. The representations of relationships between subscriber records and subscription records may be referred to as subscriber-subscription hierarchies or subscriber-subscription hierarchical data structures.

Each link between a subscription record and a subscriber record may define a relationship between the corresponding subscription and subscriber. A link between a subscription record and a subscriber record may be referred to as a subscriber-subscription map record, which may be represented in any suitable data structure and may include a unique subscriber-subscription map record identifier, a subscriber identifier associated with a subscriber record, and a subscription identifier associated with a subscription record that is tied to the subscriber record. A subscriber-subscription map record may also include a relationship identifier that has been predefined as identifying allowable types of subscriber-subscription relationships. A data table may be defined to include one or more subscriber-subscription maps identifying one or more pairs of a subscriber record and a subscription record that are associated with one another. Accordingly, combinations of any of subscriber records, subscriber map records, subscription records, subscription map records, and subscriber-subscription map records can be defined to represent subscriber-subscription hierarchies. The subscriber-subscription hierarchies in the global data may be representative of local subscriber-subscription hierarchies stored in the local data.

The subscriber-subscription hierarchies may define one-to-one, one-to-many, and many-to-one mapping relationships between subscriber records and subscription records. For example, a subscriber may have multiple subscriptions in a specific relationship type, and a subscription may be linked to more than one subscriber in a specific relationship type.

In certain embodiments, the links between subscriber records and subscription records are defined as links between respective levels of subscriber hierarchies and subscription hierarchies. Accordingly, when a particular subscription record is mapped to a particular subscriber record, any children of the subscription record are also mapped (indirectly) to the same subscriber record.

Figure 4:
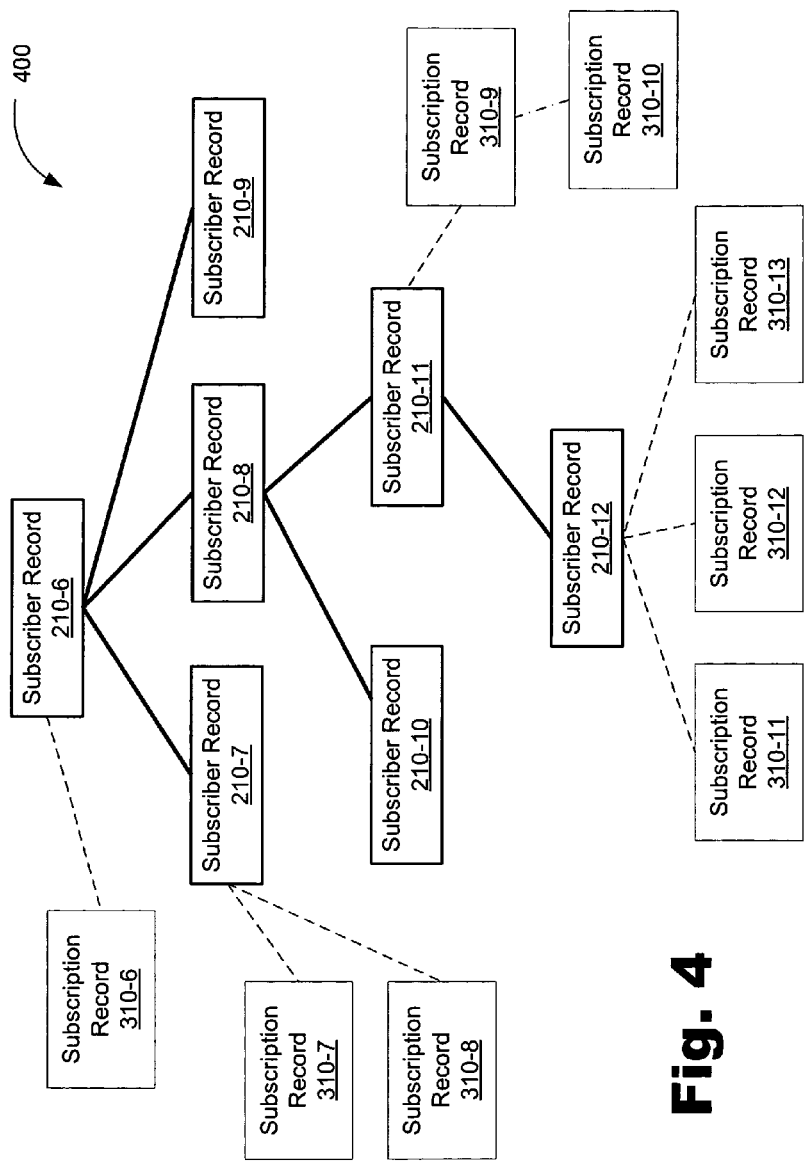
FIG. 4 illustrates an exemplary hierarchical structure in which subscription records are mapped to a hierarchical structure of subscriber records, according to an embodiment.

FIG. 4 illustrates an exemplary hierarchical data structure 400 (also referred to as "base hierarchical data structure 400") in which subscription records 310-6 through 310-13 are mapped to a hierarchical data structure of subscriber records 210-6 through 210-12, according to an embodiment. The hierarchical data structure 400 may be defined by mapping local data to a subscriber hierarchical data structure such as subscriber hierarchical data structure 200 of FIG. 2. As shown in FIG. 4, a hierarchical structure of subscriber records 210-6 through 210-12 forms a subscriber hierarchy. The solid lines connecting the subscriber records 210-6 through 210-12 represent subscriber map records linking subscriber records, as described above.

The subscription records 310-6 through 310-13 are linked to various ones of the subscriber records 210-6 through 210-12 as shown in the Figure. The uniformly dashed lines connecting the subscription records 310-6 through 310-9 and 310-11 through 310-13 to the subscriber records 210-6 through 210-12 represent subscriber-subscription map records.

In FIG. 4, the alternating short-long dashed line connecting subscription record 310-10 to subscription record 310-9 represents a subscription map record. Accordingly, subscription records 310-9 and 310-10 represent a subscription hierarchy that is mapped to subscriber record 210-11, and subscription record 310-9 represents a subscription record that is mapped to both a subscription record and a subscriber record.

In certain embodiments, at least three different relational tables are used to represent the relationships between the data records included in the hierarchical data structure 400. For example, a first table may include definitions of relationships between subscriber records (i.e., subscriber map records), a second table may include definitions of relationships between subscription records (i.e., subscription map records), and a third table may include definitions of relationships between subscriber and subscription records (i.e., subscription-subscriber map records). The use of multiple relational tables enables each global data record to have more than a single data relationship and more than one type of data relationship. For example, a subscription may be related to both subscribers and to other subscriptions. Accordingly, a global data record can be referenced by multiple different hierarchical data structures, as will be described further below.

The global data may include definitions of allowable types of data relationships. The definitions may reflect local data relationships represented in the local data and may be used to ensure that local data relationships are maintained with integrity at the global level. The relationship definitions may be implemented in one or more relational tables, and each allowable type of data relationship may be assigned a relationship type identifier.

With the global data including one or more hierarchical data structures (e.g., hierarchical data structure 400) defined as described above, the system 100 is able to support the definition and creation of custom, user-defined hierarchical data structures at the global level, without impacting or being limited by the internal requirements of the local data stored in the data subsystems 100 or by the mappings between the global and the local data. For example, through the access device 160, a user can access the customization subsystem 150, including defining and providing a set of custom data relationships to the customization subsystem 150. The customization subsystem 150 is able to generate, based on the set of custom data relationships provided by the user, one or more custom hierarchical data structures on top of a base hierarchical data structure (e.g., hierarchical data structure 400 of FIG. 4), without affecting the data relationships represented by the base hierarchical data structure. Custom hierarchical data structures define custom groupings of customer data (e.g., subscriptions represented by subscription records). From the custom hierarchical data structures, the system 100 can generate different views of customer data, including customized views of customer account information, as described below.

E. Customization Subsystem

Returning now to FIG. 1, the customization subsystem 150 may include or be implemented on one or more computing devices (e.g., servers). In certain embodiments, the customization subsystem 150 includes one or more servers configured to communicate with the access device 160 over a communication network. The communication network may include any network suitable for carrying communications between the access device 160 and the customization subsystem 150, including, but not limited to, the Internet or an intranet. In certain embodiments, the customization subsystem 150 includes one or more web servers configured to provide web-based communications (e.g., Hypertext Markup Language ("HTML") messages) to the access device 160. In certain embodiments, the customization subsystem 150 provides an access portal by which customers (i.e., users associated with customers) can access and manage information associated with customer accounts with an enterprise.

The customization subsystem 150 is configured to receive input messages from the access device 160. The input messages may include commands defining new custom hierarchical data structures (i.e., new data relationships represented by new custom hierarchical data structures) and/or requesting specific views of data hierarchies (i.e., groupings of customer accounts defined by the data hierarchies). The commands may include externally-defined (e.g., customer-defined) definitions of new custom global data records and/or new relationships between global data records. Based on the content of the input messages, the customization subsystem 150 is able to use the global data (or at least a subset of the global data) stored at the data integration subsystem 120 to create custom hierarchical data structures. In certain embodiments, the customization subsystem 150 is configured to generate one or more custom hierarchical data structures on top of one or more base hierarchical data structures (e.g., base hierarchical data structure 400 of FIG. 4) included in the global data. By creating custom hierarchical data structures on top of a base hierarchical data structure (e.g., as a layer over the base hierarchical data structures), custom hierarchical data structures can be flexibly defined by customers as may serve the business purposes of the customer and without altering or otherwise impacting the data relationships represented by the base hierarchical data structure.

Figure 5:
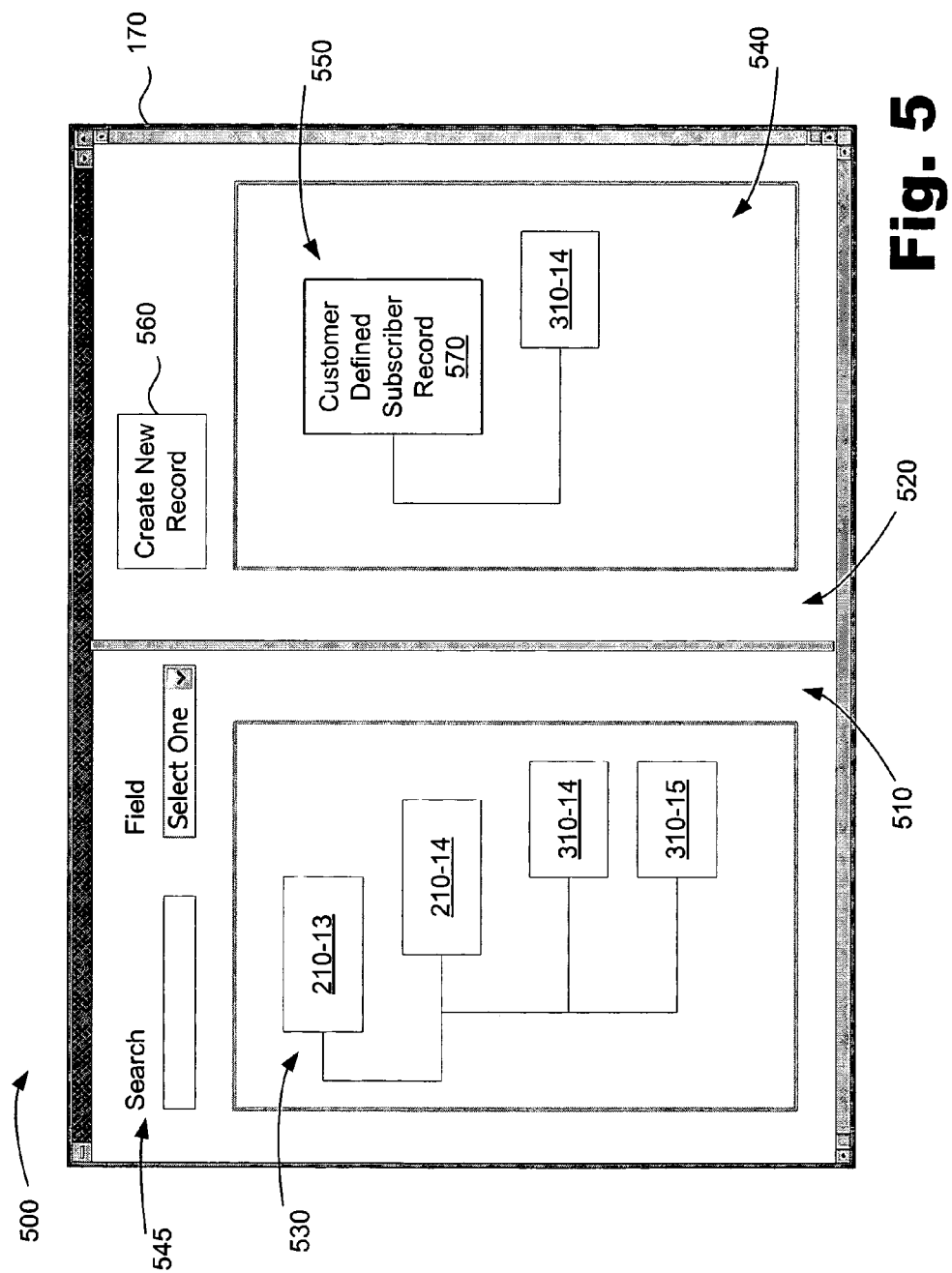
FIG. 5 illustrates an exemplary graphical user interface through which a user is able to define a custom data hierarchical structure, according to an embodiment.

FIG. 5 illustrates an exemplary graphical user interface 500 ("GUI 500") that the customization subsystem 150 may provide to the access device 160 for presentation to a user in the user interface 170. The GUI 500 provides data management tools by which a user is able to define a custom data hierarchical structure. As shown in FIG. 5, the GUI 500 may be divided into a first portion 510 and a second portion 520. The first portion 510 may include information associated with a base hierarchical data structure 530 that is related to a particular customer of an enterprise, and the second portion 520 may include a workspace 540 useful for defining a custom hierarchical data structure.

The first portion 510 of the GUI 500 includes a graphical representation of a base hierarchical data structure 530 having subscriber records 210-13 and 210-14 and subscription records 310-14 and 310-15 linked to one another as shown. Subscriber record 210-14 is a child of subscriber record 210-13, and subscription records 310-14 and 310-15 are linked to subscriber record 210-14. As described above, the links between the records included in a base hierarchical data structure such as the base hierarchical structure 530 are representative of a first set of data relationships.

The first portion 510 of the GUI 500 also includes a search tool 545 by which a user can define a query for information included in or otherwise associated with the base hierarchical structure 530. The user may select a field of search and provide terms to be searched. The field of search may include any data field included in or otherwise associated with the base hierarchical structure 530. Examples of search fields include, but are not limited to, account identifiers (e.g., account numbers), bill cycle dates, service dates, service statuses, addresses, zip codes, area codes, account types, subscriber types, subscriber identifiers, summary or statement identifiers, purchase order identifiers, and any other field that may be useful for identifying customer account information. Queries may also be constructed for searching combinations of data fields. For example, a user may define a query for accounts associated with a specific area code and a particular service type (e.g., long distance service). The search tool 545 enables users to conveniently search enterprise data to identify specific information that the user may wish to include in a custom hierarchical data structure. The first portion 510 of the GUI 500 may also provide a user with other tools helpful for identifying information associated with the base hierarchical data structure 530.

In certain embodiments, a search initiated with the search tool 545 extends only to the global data. In other embodiments, some searches, including searches having certain parameters (e.g., bill cycle dates or circuit identifiers) may be extended beyond the global data, including to the local data in the data subsystems 110, for example.

The workspace 540 in the second portion 520 of the GUI 500 is helpful for defining a new custom hierarchical data structure based on information included in the base hierarchical data structure 530. A user can select and copy (e.g., drag and drop) graphical representations of data records (e.g., subscriber record 210-13 or subscription record 310-14) from the base hierarchical data structure 530 to the workspace 540. The user may position data records in the workspace 540 such that the placement of the data records in relation to one another determines the relationships between the records. For example, a graphical representation of a subscription record may be placed at a position relative to a graphical representation of a subscriber record that indicates that the subscription record is a child of the subscriber record. Alternatively or additionally, a user may create a graphical line between two records to define a relationship between the records. Of course, other suitable tools may be used for defining relationships between data records.

As shown in FIG. 5, the workspace 540 includes a custom hierarchical data structure 550 having a subscription record 310-14 linked to a customer-defined subscriber record 570. A user is not limited to using only preexisting subscriber data records to define a custom hierarchical data structure. Rather, the user may be provided with tools for creating new customer-defined subscriber records such as customer-defined subscriber record 570. The second portion 520 of the GUI 500 includes a "Create New Record" icon 560 that when selected by the user will provide the user with one or more tools for defining a new subscriber record. A customer-defined subscriber record may be represented as any suitable data object or structure and does not necessarily correspond with a legal customer entity.

A user may define a new subscriber record as may serve the purposes of the customer. For example, a user may wish to organize customer accounts by geographic area. The user may create a customer-defined subscriber record such as customer-defined subscriber record 570 and associate certain customer accounts related to the geographic area with the new subscriber record. By way of just one example, customer-defined subscriber record 570 may be titled "Area Code 781" and may be defined to create a grouping of customer accounts for telephone numbers including area code "781." After creating the customer-defined subscriber record 570, the user can utilize the search tool 545 to initiate a search for customer accounts associated with the customer and having an area code of "781." The search results may be graphically represented in the first portion 510 of the GUI 500, and the user may select from the list of search results any subscription records to be linked to the customer-defined subscriber record 570. In this manner, the user is able to create a custom hierarchical data structure including a grouping of customer accounts sharing a common area code. In similar manner, the user may create other custom hierarchical data structures as may serve the business purposes of the customer.

By way of another example, a customer may create a custom hierarchical data structure for a particular branch location. A user can create a new subscriber record as described above, search the base hierarchical structure associated with the customer for accounts tied to the address of the branch location, and link the subscriber records representative of such accounts to the new subscriber record. Such a grouping of customer accounts allows the customer to view and assess the services provided to a specific location. This is especially beneficial when the specific location subscribes to multiple different types of services (e.g., local telephone service, long distance telephone service or Voice over Internet Protocol service, and a data service) having information scattered across different data subsystems 110 of the enterprise.

By creating a custom hierarchical data structure, a customer is able to define new relationships between the data (or at least a subset of the data) included in a base hierarchical data structure. If the base hierarchical data structure 530 is said to represent a first set of data relationships, the custom hierarchical data structure 550 may be described as representing a second set of data relationships. Subscription record 310-14 provides a specific example. In the base hierarchical data structure 530, subscription record 310-14 is related to subscriber record 210-14. In the custom hierarchical data structure 550, subscription record 310-14 is related to customer-defined subscriber record 570. Thus, subscription record 310-14 is able to have multiple separate and independent relationships to different data records. In other words, the relationship of subscription record 310-14 to customer-defined subscriber record 570 does not alter or affect the relationship of subscription record 310-14 to subscriber record 210-14. The representation of multiple and independent data relationships are supported by generating custom hierarchical data structures on top of base hierarchical data structures.

While the GUI 500 provides tools by which customers can define and change or otherwise manage customer hierarchical data structures, the base hierarchical data structures are typically fixed, meaning that the base hierarchical data structures are unchangeable by customers. Of course, the system 100 and/or operators or administrators of the system 100 may update the base hierarchical structures to reflect changes in local data or other customer-related information.

Figure 6:
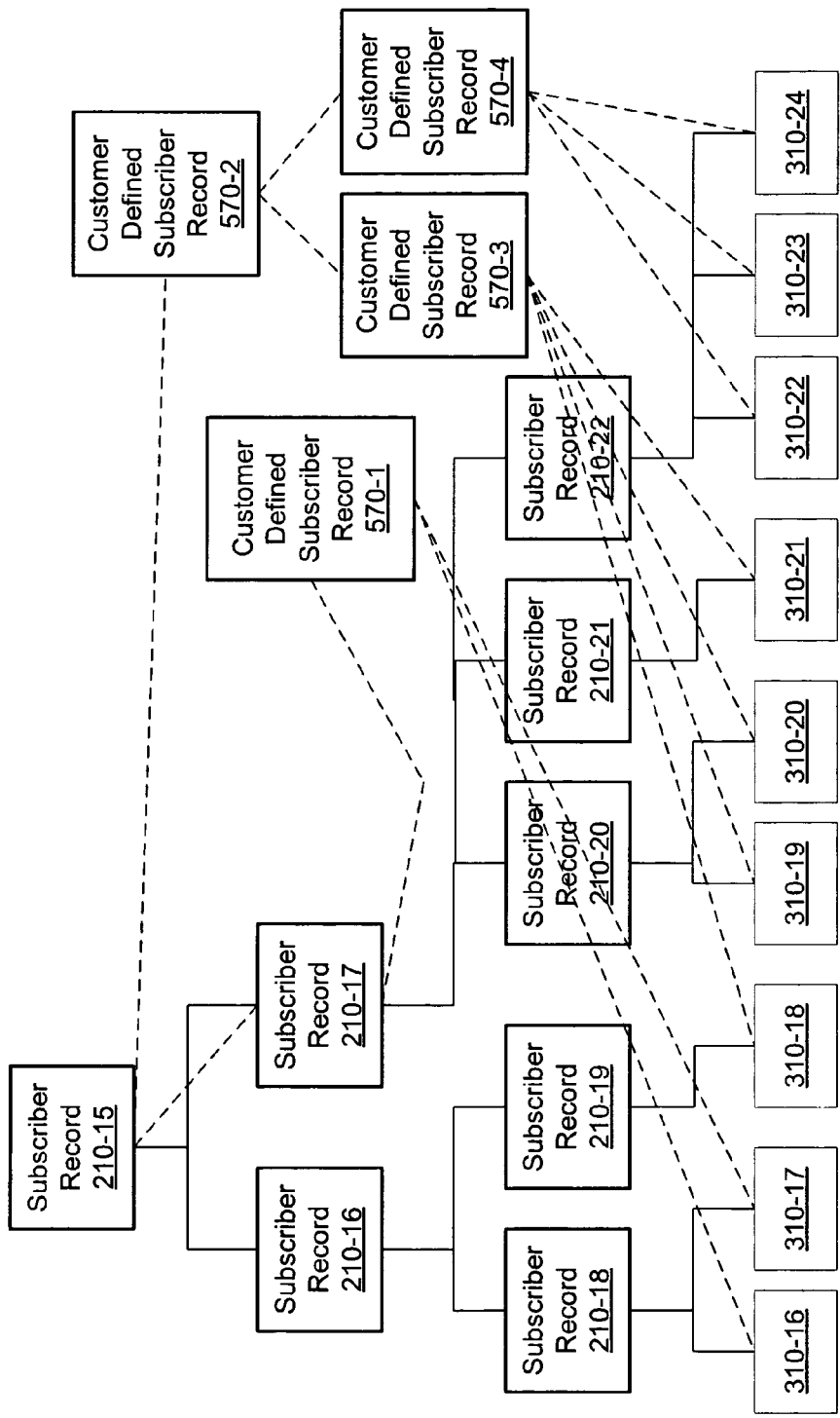
FIG. 6 illustrates two exemplary customer-defined hierarchical data structures in relation to an exemplary base hierarchical structure of subscriber and subscription records, according to an embodiment.

FIG. 6 illustrates two exemplary custom hierarchical data structures in relation to an exemplary base hierarchical data structure, according to an embodiment. As shown in the Figure, subscriber records 210-15 through 210-22 and subscription records 310-16 through 310-24 form a base hierarchical structure of subscriber records and subscription records linked as shown. The base hierarchical structure may be defined as part of the global data and may represent a first set of data relationships, as described above.

A customer associated with the top-level subscriber record 210-15 may define custom hierarchical data structures as described above in relation to the GUI 500 of FIG. 5. In FIG. 6, two custom hierarchical structures are illustrated as subscriber and subscription records linked to one another by dashed lines. In a first custom data hierarchy, subscriber record 210-15 is linked to subscriber record 210-17 by a dashed line, and subscriber record 210-17 is in turn linked to a customer-defined subscriber record 570-1 by another dashed line. The customer-defined subscriber record 570-1 is linked to subscription records 310-16 and 310-17 by two additional dashed lines. Accordingly, a first custom hierarchical data structure includes subscriber records 210-15 and 210-17, customer-defined subscriber record 570-1, and any subscriptions (e.g., subscriptions 310-16 and 310-17) linked to these subscriber records. The first custom hierarchical data structure represents a second set of data relationships between data records, including some of the data records also included in the base hierarchical data structure of FIG. 6. As shown in FIG. 6, the first custom hierarchical data structure is generated on top of the base hierarchical data structure, meaning that the first set of data relationships represented by the base hierarchical data structure are independent of the second set of data relationships represented by the first custom hierarchical data structure, even though the two data structure share common data records.

By way of another example, a second custom hierarchical data structure shown in FIG. 6 includes subscriber record 210-15 linked to customer-defined subscriber record 570-2 by a dashed line. The customer-defined subscriber records 510-2 is linked to customer-defined subscriber records 510-3 and 510-4 by two dashed lines, and customer-defined subscriber records 510-3 and 510-4 are in turn linked to subscription records 310-18 through 310-24 as represented by the interconnecting dashed lines shown in the Figure. As with the first custom hierarchical data structure, the second custom hierarchical data structure shown in FIG. 6 is defined by a customer and generated by the system 100 on top of the base hierarchical data structure of FIG. 6. Accordingly, the second custom hierarchical data structure represents a third set of data relationships.

As shown in FIG. 6, each of the data hierarchical structures defines a different grouping of subscription records. Accordingly, customers are able to define custom groupings of customer accounts by creating custom data hierarchical structures. The system 100 is robust and flexible in that it supports concurrent representation of multiple and independent sets of data relationships between data records.

The customization subsystem 150 may be configured to generate new map records to represent customer-defined data relationships between data records. The new map records may be identified as being customer defined so that many different types of relationships can be created by customers and represented by the system 100, without being limited to only the types of data relationships allowed in base hierarchical structures. Accordingly, if a customer defines a customer hierarchical data structure to include one or more types of relationships that are not already defined or are not allowed in a corresponding base hierarchical data structure, the customization subsystem 150 can create new relationship definitions to support the custom hierarchical data structures. This provides customers with significant flexibility for customizing custom hierarchical data structures without being limited by the internal data requirements of an enterprise.

Customer-defined map records may be represented as any suitable data objects or other data structures and may include information representative of two data records and a type of relationship between the two data records. Customer-defined map records may be maintained in one or more tables of map records. The customer-defined map records may be maintained in a table that is separate from any table used to maintain map records that are included in base hierarchical data structures. This helps protect the integrity of the data records and relationships associated with base hierarchical data structures.

The customization subsystem 150 may be configured to provide customers with myriad different views of hierarchical data structures and/or portions of the hierarchical data structures. Accordingly, a customer can request and receive, through the access device 160, different views representative of hierarchical data structures, including custom hierarchical data structures, base hierarchical data structures, and portions thereof.

The different views made available to customers may be determined based on permission levels maintained at the customization subsystem 150. The permission levels may be externally defined. For example, a particular external party such as a customer may define and assign different permissions to different users associated with the customer to govern the views that may be accessed by the users. For any particular customer, for instance, one or more first-level users may be assigned a "super user" permission level that grants the first-level users (i.e., "super users") with unlimited access to data included in and/or associated with any hierarchical structures associated with the customer. Typically, first-level users are granted authority to view data associated with corresponding base hierarchical structures and to create and manage custom hierarchical data structures. First-level users may also be granted authority to define and assign permission levels to other users associated with the same customer.

A first-level user may define a custom hierarchical data structure as described above. The custom hierarchical data structure may define a particular grouping of customer accounts that are associated with marketing functions of the customer, for example. The first-level user may then define permission levels for the custom hierarchical data structure. The customization subsystem 150 is configured to store and maintain permission levels and to grant only users having authorization, based at least in part on the permission levels and user login information, with access to the custom hierarchical data structure.

For instance, the first-level user may wish that only certain individuals associated with cost accounting functions (e.g., certain users within an accounting department) be granted access to the custom hierarchical data structure. These individuals may be referred to as second-level users inasmuch as they are assigned a permissions level that is restrictive as compared to super users. For example, a second-level user may be assigned a permissions level that grants the user access to a particular custom hierarchical data structure but denies the user access to a base hierarchical structure. Other lower-level users (e.g., third-level users) may be assigned permissions levels that grant access only to a portion of a custom hierarchical data structure.

In this manner, a customer is able to define and control which users have access to particular hierarchical data structures and therefore to the corresponding groupings of customer account information. Users are able to view and/or operate on only the data that the user is authorized to access. Lower-level users associated with a customer may or may not be granted authority to change viewable hierarchical data structures and/or to define and assign permission levels for the data that the particular users are authorized to access.

When a user requests to view a hierarchical data structure or portions thereof, the customization subsystem 150 may be configured to communicate with the data integration subsystem 120 to identify and retrieve specific data associated with the hierarchical data structure. The retrieved data may be formatted and/or inserted into one or more messages that may be communicated to the access device 160, which can process the messages, including presenting one or more views of the hierarchical data structure in the user interface 170. In certain embodiments, the output messages include one or more hypertext markup language ("HTML") messages.

III. Exemplary Process View

Figure 7:
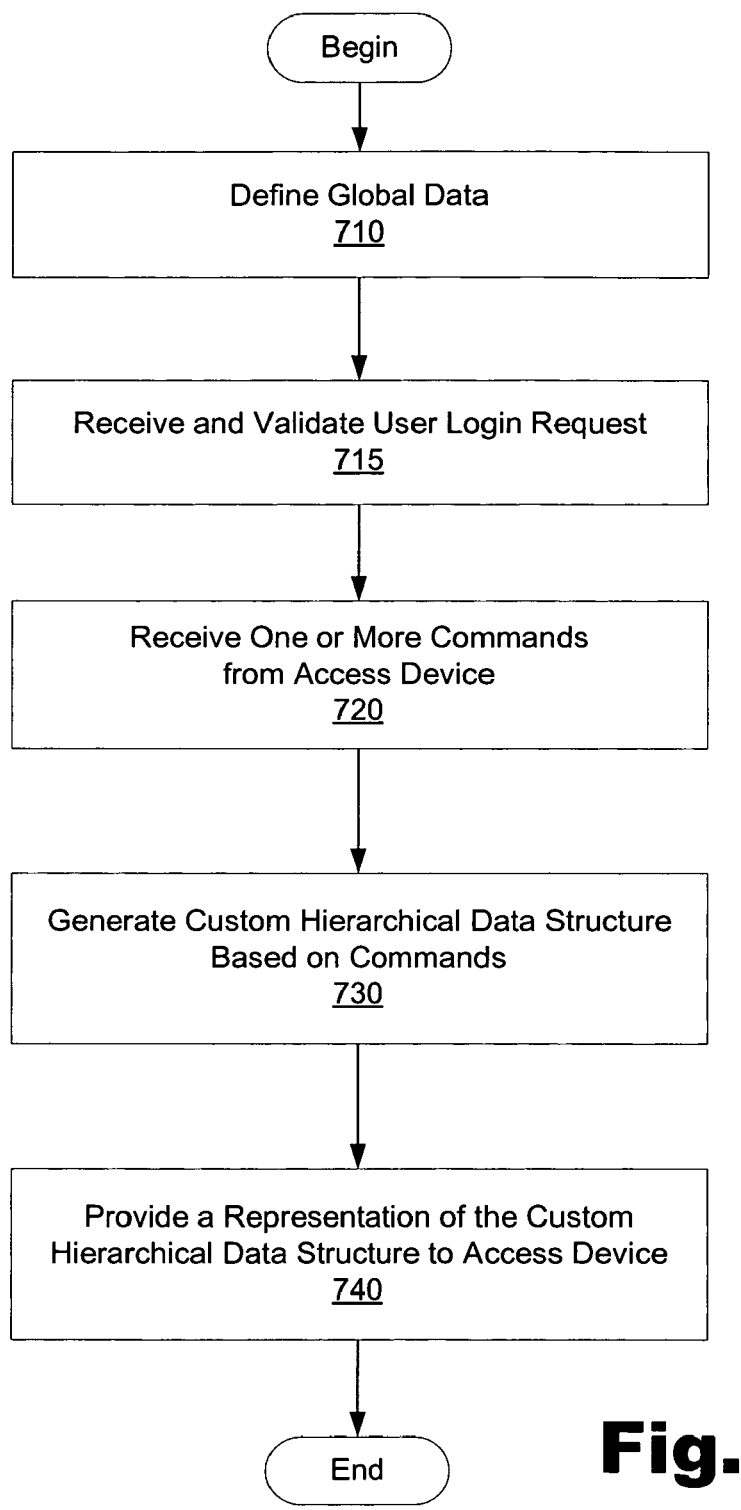
FIG. 7 is a flowchart illustrating an exemplary data management process, according to an embodiment.

FIG. 7 is a flowchart illustrating an exemplary data management process, according to an embodiment. While FIG. 7 illustrates exemplary steps according to one embodiment, other embodiments may omit, add to, reorder, and/or modify any of the steps shown in FIG. 7.

In step 710, global data is defined. Step 710 may be performed in any of the ways described above, including mapping any of the local data stored in the data subsystems 110 to global data maintained at the data integration subsystem 120. As described above, the global data may include one or more base hierarchical data structures that include data representative of relationships between customer data. A base hierarchical data structure is generally associated with and includes information related to a particular customer of an enterprise. A base hierarchical data structure may be referred to as a grouping structure at which information associated with a customer can be grouped in accordance with a first set of data relationships. The first set of data relationships and associated customer information may be obtained from the local data stored in the data subsystems 110 and/or external sources such as third-party marketing lists, as described above.

In step 715, a login request is received and validated. Step 715 may include validating user login information against permission levels maintained at the customer subsystem 150. Step 715 may be performed to ensure that only authorized users are granted access to particular groupings of data. For example, access to customer information (e.g., a base hierarchical data structure associated with a customer) is granted only to authorized users associated with the customer. The login request may be received from an access device such as access device 160.

In step 720, one or more commands are received from an external source such as the access device. Step 720 may be performed in any of the ways described above. For example, a user may utilize the access device 160 to send one or more messages to the customization subsystem 150. The commands may include data representative of new custom data relationships defined by a customer. The commands may be specified as a pre-composed stream of commands within a data file, by interactive graphical user interface input, or in any other suitable manner.

In step 730, a custom hierarchical data structure is generated based on the commands received in step 720. Step 730 may be performed in any of the ways described above, including creating a custom hierarchical data structure on top of a base hierarchical data structure included in the global data. In certain embodiments, the customization subsystem 150 is configured to generate the custom hierarchical data structure automatically without human intervention and without affecting the first set of data relationships represented by the base hierarchical data structure.

In step 740, a representation of the custom hierarchical data structure is provided to the access device. Step 740 may be performed in any of the ways described above. For example, data representative of a view of the custom hierarchical data structure, or a portion of the custom hierarchical data structure, may be inserted into one or more messages (e.g., HTML messages) that are then transmitted to the access device. The access device can present the view in a user interface (e.g., the user interface 170) for consideration by the user of the access device. Step 740 may be performed in response to a request received from the access device and after the authority of a user to access the view has been validated.

The above-described exemplary systems and methods provide customers with tools for defining custom hierarchical data structures that are tailored to the specific purposes or desires of the customers. Accordingly, customers can define new data relationships, including custom groupings of customer account information.

The customers may also request and receive different views of the hierarchical data structures. Customers may define permission levels to control user access to customer information. Hierarchical data structures and the views thereof are customizable and not limited to certain predefined views or by the internal requirements of the local data stored in the data subsystems 110.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
a plurality of databases, each database including local data; and
computer readable medium tangibly embodying computer executable instructions, the instructions including instructions to:
maintain a hierarchical data structure of subscriber records representative of relationships between subscribers, a plurality of subscription records representative of subscriptions of the subscribers, and a base hierarchical data structure in which the subscription records are mapped into the hierarchical data structure of subscriber records to indicate the subscriptions associated with the respective subscribers, the base hierarchical data structure including at least a first set of parent-child data relationships that represent a first grouping of subscriber accounts associated with a customer,
retrieve at least a portion of the local data from at least one of the databases, the local data being associated with the customer,
receive a second set of parent-child data relationships from an external source that define a new parent-child data relationship of the retrieved local data representing a second grouping of the subscriber accounts of the customer, the new parent-child data relationship including at least one new customer-defined subscriber record to which at least a portion of the subscription records and subscriber records are associated as child data,
generate a custom hierarchical data structure in response to the received second set of parent-child data relationships, wherein the custom hierarchical data structure is generated using at least a subset of the base hierarchical data structure and the second set of parent-child data relationships without impacting the first set of parent-child data relationships, and
provide the local data according to the custom hierarchical data structure to the external source.

2. The system of claim 1, wherein the external source comprises a customer and an access device, and wherein the base hierarchical data structure is unchangeable by the customer.

3. The system of claim 1, wherein the external source comprises a customer and an access device, and wherein said custom hierarchical data structure is changeable by the customer.

4. The system of claim 1, wherein said instructions further include instructions to receive one or more externally-defined permission levels from the external source.

5. The system of claim 4, wherein said instructions for said customization subsystem further include instructions to
provide a first-level user associated with the external source with access to both said base hierarchical data structure and said custom hierarchical data structure based on said one or more permission levels,
provide a second-level user associated with the external source with access to said custom hierarchical data structure based on said one or more permission levels, and
deny the second-level user access to said base hierarchical data structure based on said one or more permission levels.

6. The system of claim 5, wherein said instructions further include instructions to provide a third-level user associated with the external source with access to only a subset of said custom hierarchical data structure based on said one or more permission levels.

7. The system of claim 1, wherein said instructions further include instructions to generate said custom hierarchical data structure without impacting said first set of parent-child data relationships.

8. The system of claim 1, wherein said first set of parent-child data relationships defines a first grouping of subscription records, and said second set of parent-child data relationships defines a second grouping of at least a subset of said subscription records.

9. The system of claim 1, wherein said base hierarchical data structure is included in global data that is mapped from local data stored in a plurality of heterogeneous databases.

10. The system of claim 1, wherein said instructions further include instructions to provide a graphical representation of at least a portion of said custom hierarchical data structure to the external source.

11. The system of claim 1, wherein said instructions further include instructions to provide a graphical user interface to the external source, said graphical user interface including one or more tools for defining said second set of parent-child data relationships.

12. The system of claim 11, wherein said one or more tools includes a search tool for searching for information associated with said base hierarchical data structure.

13. The system of claim 11, wherein said one or more tools includes a tool configured to allow for creation of new customer-defined subscriber records and a tool configured to allow for the association of least a portion of the local data to a new customer-defined subscriber record.

14. The system of claim 1, wherein said first set of parent-child data relationships is representative of one or more legal relationships between subscriber records and associations of one or more subscription records to at least a subset of said subscription records.

15. The system of claim 1, wherein the first grouping of subscriber accounts of the customer is defined according to an enterprise associated with the plurality of databases, and the second grouping of subscriber accounts is defined according to a view of data desired by the customer.

16. A system comprising:
a plurality of heterogeneous databases storing local data associated with an external party, said plurality of heterogeneous databases being maintained by an internal party; and
computer readable medium tangibly embodying computer executable instructions, the instructions including instructions to:
maintain a hierarchical data structure of subscriber records representative of relationships between subscribers, a plurality of subscription records representative of subscriptions of the subscribers, and a base hierarchical data structure in which the subscription records are mapped into the hierarchical data structure of subscriber records to indicate the subscriptions associated with the respective subscribers, the base hierarchical data structure including a first set of parent-child data relationships that represents relationships between the subscriber records and the subscription records associated with the external party, the first set of parent-child data relationships indicative of a first grouping of subscriber accounts of a customer, wherein the first set of parent-child data relationships is unchangeable by the external party,
retrieve at least a portion of the local data from at least one of the databases, the retrieved local data being associated with the external party,
provide a graphical user interface to the external party, said graphical user interface including one or more tools configured to allow the external party to define a second set of parent-child data relationships,
receive a second set of parent-child data relationships from the external party, the second set of parent-child data relationships defining a new parent-child data relationship of the retrieved local data representing a second grouping of subscriber accounts of the customer, the new parent-child data relationship including at least one new customer-defined subscriber record to which at least a portion of the subscription records and subscriber records are associated as child data,
generate a custom hierarchical data structure representative of said second set of parent-child data relationships in response to receiving the second set of parent-child data relationships, wherein the custom hierarchical data structure is generated using at least a subset of the base hierarchical data structure and the second set of parent-child data relationships without impacting the first set of parent-child data relationships, and
provide said local data according to said custom hierarchical data structure to said external party.

17. The system of claim 16, wherein the internal party comprises an enterprise and the external party comprises a customer of the enterprise.

18. A method comprising:
receiving at least a portion of local data from at least one of a plurality of databases, the received local data being associated with a customer;
maintaining a hierarchical data structure of subscriber records representative of relationships between subscribers, a plurality of subscription records representative of subscriptions of the subscribers, and at least one base hierarchical data structure in which the subscription records are mapped into the hierarchical data structure of subscriber records to indicate the subscriptions associated with the respective subscribers, the base hierarchical data structure including at least a first set of parent-child data relationships, wherein the first set of parent-child data relationships represent a first grouping of subscriber accounts associated with the customer;
receiving a second set of parent-child data relationships from an external source that define a new parent-child data relationship of said received local data representing a second grouping of subscriber accounts of the customer, the new parent-child data relationship including at least one new customer-defined subscriber record to which at least a portion of the subscription records and subscriber records are associated as child data;
generating a custom hierarchical data structure in response to receiving the second set of parent-child data relationships, wherein the custom hierarchical data structure is generated using at least a subset of the base hierarchical data structure and the second set of parent-child data relationships without impacting the first set of parent-child data relationships; and
providing said local data according to said custom hierarchical data structure to said external source.

19. The method of claim 18, wherein the external source comprises a customer and an access device, and further comprising preventing the customer from changing said base hierarchical data structure.

20. The method of claim 18, wherein the external source comprises a customer and an access device, and further comprising enabling the customer to change said custom hierarchical data structure.

21. The method of claim 18, further comprising receiving one or more externally-defined permission levels from the external source.

22. The method of claim 21, further comprising:
providing a first-level user associated with the external source with access to both said base hierarchical data structure and said custom hierarchical data structure based on said one or more permission levels;
providing a second-level user associated with the external source with access to said custom hierarchical data structure based on said one or more permission levels; and
denying the second-level user access to said base hierarchical data structure based on said one or more permission levels.

23. The method of claim 22, further comprising providing a third-level user associated with the external source with access to only a subset of said custom hierarchical data structure based on said one or more permission levels.

24. The method of claim 18, wherein said generating step is performed automatically without human intervention and without impacting said first set of parent-child data relationships.

25. The method of claim 18, further comprising providing a graphical representation of at least a portion of said custom hierarchical data structure to the external source.

26. The method of claim 18, further comprising providing a graphical user interface to the external source, said graphical user interface including one or more tools for defining said second set of parent-child data relationships.

* * * * *